(No Model.)
C. A. E. SIMPSON.
Vehicle Spring Brace.
No. 232,079. Patented Sept. 7, 1880.
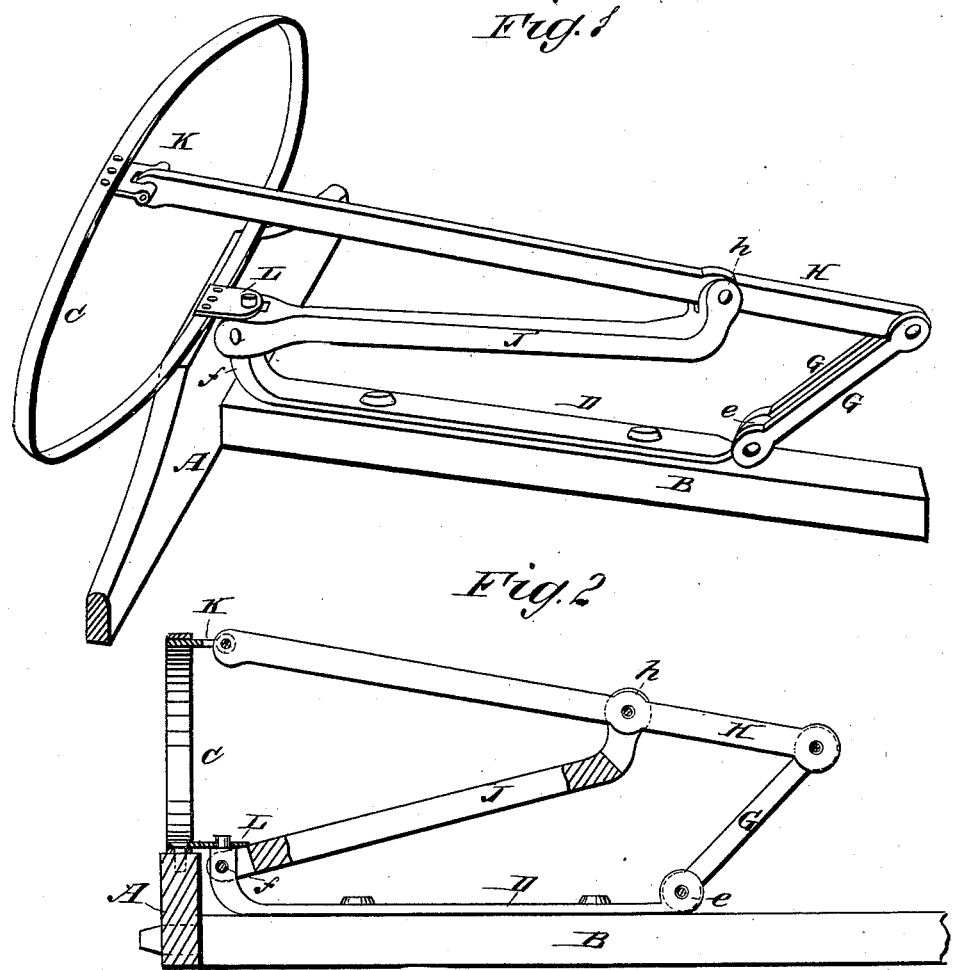
WITNESSES:
Francis McArdle
C. Sedgwick
INVENTOR:
C. A. E. Simpson
BY
ATTORNEYS.

UNITED STATES PATENT OFFICE.

CHARLES A. E. SIMPSON, OF PORTSMOUTH, OHIO, ASSIGNOR TO HIMSELF AND GUSTAV H. HEINISCH, OF SAME PLACE.

VEHICLE-SPRING BRACE.

SPECIFICATION forming part of Letters Patent No. 232,079, dated September 7, 1880.

Application filed July 1, 1880. (No model.)

*To all whom it may concern:*

Be it known that I, CHARLES A. E. SIMPSON, of Portsmouth, in the county of Scioto and State of Ohio, have invented a new and useful Improvement in Braces for Vehicle-Springs, of which the following is a specification.

My invention relates to means for preventing lateral vibration of the springs when they are depressed by the load or body of the vehicle in passing over rough surfaces or in ascending or descending a hill.

In the accompanying drawings, Figure 1 is a perspective view illustrating a mode of carrying out my invention. Fig. 2 is a longitudinal vertical sectional view of the same.

Similar letters of reference indicate corresponding parts.

The invention may be applied to or connected with either or both of the axle-trees. The drawings represent it as applied to the rear axle-tree.

A represents the axle-tree; B, the reach or perch, and C on elliptical vehicle-spring of any suitable description. On the top of the reach B is secured a bar, D, at the front and rear ends of which are eyes or perforated lugs *e f*.

If desired, the bar D may be dispensed with, and the eyes may be attached directly to the reach.

To the eye or lug *e* is pivoted the rear or lower end of a rod or bar, G, the front or upper end of which is pivoted to the front end of a bar, H. The rear end of the bar H is pivoted to a plate, K, which is rigidly attached to the upper leaf of the spring C. If preferred, however, this bar H may be connected to the bottom of the body of the vehicle.

To the rear eye or lug, *f*, is pivoted the rear end of a bar, J, the front end of which is pivoted to the bar H at a point, *h*, distant from pivot in plate K equal to length of bar J. The rear end of this bar J is about on a level with the lower leaf of the spring C, and said lower leaf may be connected with the rear portion of the bar D by means of a plate, L, for the purpose of increasing the strength and steadiness of the parts.

The bars D, J, G, and H thus arranged and connected with the spring and the reach prevent any lateral vibration or deviation of the spring toward either the front or rear of the vehicle when passing over rough ground, or when ascending or descending a hill.

I am aware that a brace has been pivoted to a bar bolted to the upper portion of the spring and to the carriage-frame, as well as to a knee-joint, the said knee-joint being pivoted to said bar and to another bolted to the reach; but this necessitates the particular measurement of each vehicle, so that the brace may be constructed and adapted to be applied to it, while each one of mine is adjustable and adapted to any vehicle, so that mine may all be made from the same pattern.

What I claim as new is—

The combination of the bars D G H J, constructed, relatively arranged, and adapted to be applied to the axle, reach, and spring of various vehicles as specified.

CHARLES AUSTIN E. SIMPSON.

Witnesses:
W. H. WILLIAMS,
S. BEATTY.